(12) United States Patent
Graul et al.

(10) Patent No.: US 11,446,827 B2
(45) Date of Patent: Sep. 20, 2022

(54) END EFFECTOR WITH MOVABLE PROTECTIVE SLEEVE FOR MACHINING WORKPIECES, AND ROBOT SYSTEM COMPRISING AN END EFFECTOR

(71) Applicant: ABB Schweiz AG, Baden (CH)

(72) Inventors: Jan-Sebastian Graul, Frankfurt am Main (DE); Christian Goy, Nidderau (DE)

(73) Assignee: ABB Schweiz AG, Baden (CH)

( * ) Notice: Subject to any disclaimer, the term of this patent is extended or adjusted under 35 U.S.C. 154(b) by 537 days.

(21) Appl. No.: 16/583,429

(22) Filed: Sep. 26, 2019

(65) Prior Publication Data

US 2020/0039088 A1 Feb. 6, 2020

Related U.S. Application Data

(63) Continuation of application No. PCT/EP2018/052240, filed on Jan. 30, 2018.

(30) Foreign Application Priority Data

Mar. 27, 2017 (DE) .................... 10 2017 106 455.9

(51) Int. Cl.
*B25J 13/00* (2006.01)
*B25J 15/00* (2006.01)
(Continued)

(52) U.S. Cl.
CPC ......... *B25J 15/0019* (2013.01); *B25J 13/084* (2013.01); *B25J 13/086* (2013.01);
(Continued)

(58) Field of Classification Search
CPC .... B25J 19/06; B25J 15/0019; B25J 19/0075; B25J 13/086; B25J 19/02; B25J 13/084; B23P 19/06
See application file for complete search history.

(56) References Cited

U.S. PATENT DOCUMENTS

2018/0243926 A1 8/2018 Gerhard

FOREIGN PATENT DOCUMENTS

DE 102007035958 A1 2/2009
DE 202013105501 U1 3/2015
(Continued)

OTHER PUBLICATIONS

Tholey et al., A Modular, Automated Laparoscopic Grasper with Three-Dimensional Force Measurement Capability, 2007, IEEE, p. 250-255 (Year: 2007).*

(Continued)

*Primary Examiner* — McDieunel Marc
(74) *Attorney, Agent, or Firm* — Leydig, Voit & Mayer, Ltd.

(57) ABSTRACT

An end effector includes: a tool holder; a tool which is attached in protruding fashion to the tool holder; a sleeve which is movable on the tool holder between a protective position in which it surrounds the tool and a usage position in which it is pushed towards the tool holder and can release at least a tip of the tool; and a blocking element which is movable, under control of a sensor for detecting a proximity of the end effector to a workpiece, between a blocking position in which it blocks the sleeve in the protective position, and a release position in which it allows a movement of the sleeve into the usage position.

13 Claims, 2 Drawing Sheets

(51) Int. Cl.
B25J 13/08 (2006.01)
B25J 19/00 (2006.01)
B25J 19/02 (2006.01)
B23P 19/06 (2006.01)

(52) U.S. Cl.
CPC .......... B25J 19/0075 (2013.01); B25J 19/02 (2013.01); *B23P 19/06* (2013.01)

(56) References Cited

FOREIGN PATENT DOCUMENTS

| DE | 102013020138 A1 | 6/2015 |
|----|-----------------|--------|
| DE | 102014221645 A1 | 4/2016 |
| DE | 102015216665 A1 | 3/2017 |
| GB | 571794 A | 9/1945 |
| WO | WO 2017036690 A1 | 3/2017 |

OTHER PUBLICATIONS

Yadav et al., Euclidean distance and workspace region based control algorithm for collision avoidance in a laparoscopic surgical robot: MU-LapaRobot, 2012, IEEE, 2056-2601 (Year: 2012).*

Rabenorosoa et al., A micro-assembly station used for 3D reconfigurable hybrid MOEMS assembly, 2009, IEEE, p. 95-100 (Year: 2009).*

Cassier et al., Combination of vision servoing techniques and VR-based simulation for semi-autonomous microassembly workstation, 2002, IEEE, p. 1501-1506 (Year: 2002).*

* cited by examiner

END EFFECTOR WITH MOVABLE PROTECTIVE SLEEVE FOR MACHINING WORKPIECES, AND ROBOT SYSTEM COMPRISING AN END EFFECTOR

This application is a continuation of International Patent Application No. PCT/EP2018/052240, filed on Jan. 30, 2018, which claims priority to German Patent Application No. DE 10 2017 106 455.9, filed on Mar. 27, 2017. The entire disclosure of both applications is hereby incorporated by reference herein.

FIELD

The present invention concerns an end effector for machining a workpiece under application of force.

BACKGROUND

For many types of workpiece machining, it is necessary for a force to be applied to the workpiece by a tool, either to deform the workpiece directly by the application of force, such as in punching, riveting etc., or because the machining is only successful under sufficient pressure, such as in spot welding, or because the engagement of the tool may be lost without the application of force, such as in screwing.

If a person may be present in the movement region of a robot performing the machining, it must be ensured that at the time of force application, no body part of the person may be present between the tool and the workpiece and be injured by the application of force.

DE 10 2007 035 958 A1 describes an end effector for a screwing robot which, surrounded by a cylindrical shell, comprises a tool holder and a screwing tool which can be driven rotationally by the tool holder. The tool holder and tool are axially movable inside the shell. When both are in a retracted position, a screw is introduced into the shell through a side opening of the shell and reaches a position in which its head is facing the screwing tool, its shank is held in the tapered tip of the shell, and its tip protrudes from the shell. In this position, the screwing tool may be advanced again in order to engage in the head of the screw and screw this into the workpiece. No auxiliary means are provided for preventing a body part of a person from being caught between the screw and the tool.

SUMMARY

In an embodiment, the present invention provides an end effector, comprising: a tool holder; a tool which is attached in protruding fashion to the tool holder; a sleeve which is movable on the tool holder between a protective position in which it surrounds the tool and a usage position in which it is pushed towards the tool holder and configured to release at least a tip of the tool; and a blocking element which is movable, under control of a sensor configured to detect a proximity of the end effector to a workpiece, between a blocking position in which it blocks the sleeve in the protective position, and a release position in which it allows a movement of the sleeve into the usage position.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
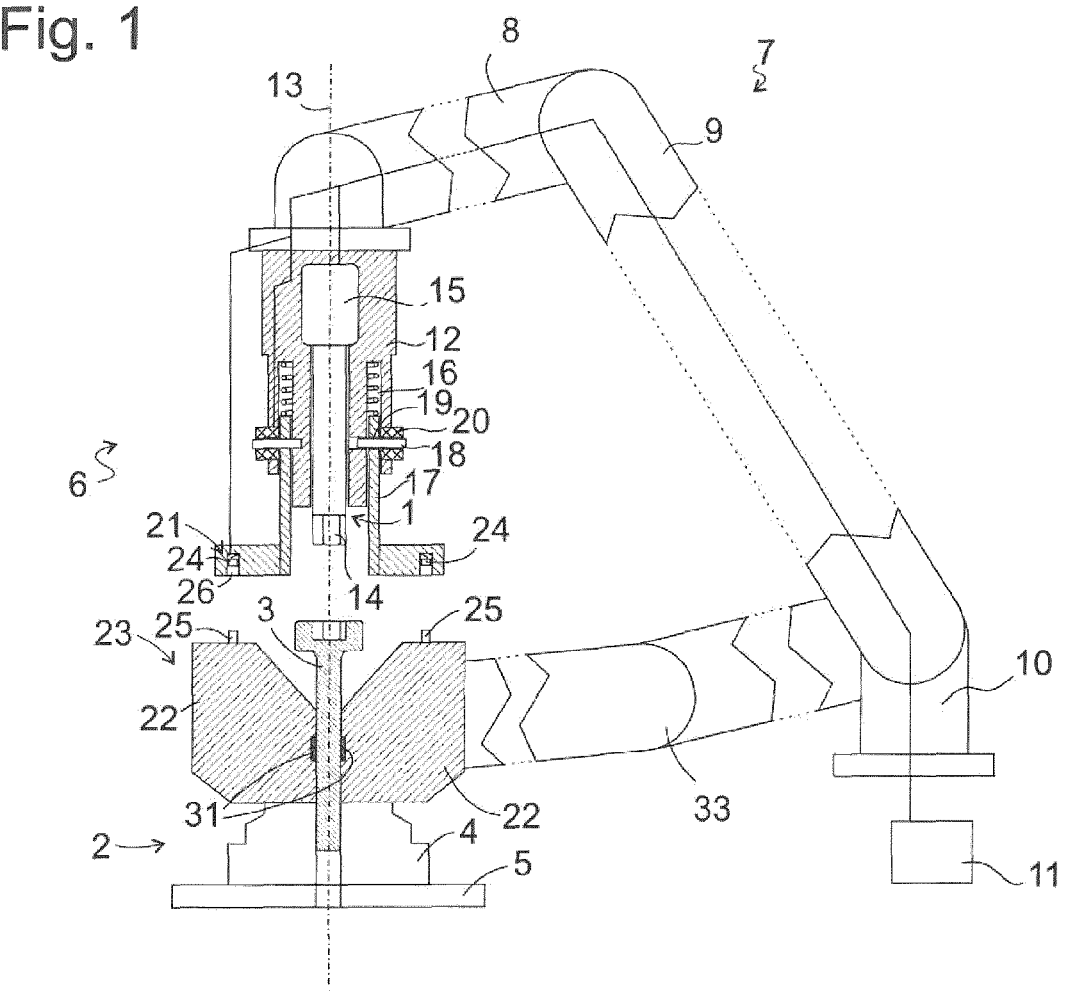
FIG. 1 shows a diagrammatic cross-section through the end effector and workpiece holder of a robot system according to the invention in a phase of approach of the end effector to the workpiece holder.

In an embodiment, the present invention provides an end effector for machining of a workpiece, with which injury to persons from the force exerted for machining can be excluded.

This object is achieved in that in an end effector with a tool holder, a tool which is attached in protruding fashion to the tool holder, and a sleeve which can be moved on the tool holder between a protective position in which it surrounds the tool and a usage position in which it is pushed towards the tool holder and releases at least a tip of the tool, the end effector comprises a blocking element which can be moved, under the control of a sensor detecting the proximity of the end effector to a workpiece, between a blocking position in which it blocks the sleeve in the protective position, and a release position in which it allows a movement of the sleeve into the usage position.

As long as the tool is retracted into the protective position in the interior of the sleeve, no force can be exerted by the tool either onto the workpiece or onto a body part of a person accidentally present between the tool and the workpiece or another immovable object; deflection of the sleeve which exposes the tool is possible only in the vicinity of the workpiece, wherein the proximity to the workpiece necessary to release the sleeve may be set sufficiently small for there to be insufficient space for any body part between the shell and the workpiece.

In the release position of the blocking element, the sleeve can be moved freely between the protective position and the usage position by a force acting from the outside. Thus the sleeve can be moved in particular into the usage position by contact with the workpiece when the workpiece holder moves forward against the workpiece.

A spring or another return device generating a return force may be provided which loads the sleeve in the protective position. The spring or return device ensures that, if the end effector moves back away from the workpiece after machining, the sleeve automatically returns to the protective position so that on renewed approach to the workpiece, the protection is active again.

The above-mentioned sensor may be part of the end effector; under some circumstances however, as will be explained in more detail below, it may also be a part separate from the end effector in a robot system comprising the end effector.

When the sensor is part of the end effector, it may suitably be arranged on the sleeve; thus the maximum distance between the sensor and an object in order for the sensor to detect the proximity of the workpiece can be minimized; in particular, a touch-sensitive sensor or a proximity sensor may be used.

In order to detect the proximity of the end effector to the workpiece, the sensor contained in the end effector may be sensitive to the workpiece itself; it may however also be suitable if, instead of responding to the workpiece, it responds to the holder, since in contrast to the workpiece, the holder may be optimized with regard to reliable detection by the sensor.

If the sensor is not part of the end effector, in particular it may be part of a workpiece holder.

In this case naturally it is pointless for the sensor to detect its own proximity to the workpiece or workpiece holder; instead, its proximity to the tool or tool holder may be detected.

The object is furthermore achieved by a robot system with a tool holder, an end effector as described above, and a drive unit for moving the end effector relative to the tool holder.

Such a robot system may furthermore comprise an energy converter for actuating the tool, and a control unit which is configured to actuate the energy converter only when the blocking element is in the release position. The type of energy converter depends on the type of machining or the tool provided for this. If the latter is a welding electrode, the energy converter may be a power pack which supplies electrical energy in the form of a welding current; if the tool is a screwing, boring or milling tool, the energy converter is then a motor which supplies mechanical energy for driving the tool rotation etc.

If the sensor is part of the end effector, the tool holder may comprise at least one feature which can be detected by the sensor, such as a coding which allows a highly selective distinction of the tool holder from other objects, so that actuation of the tool can be reliably avoided in cases in which the end effector is not correctly positioned on the tool holder.

If alternatively the sensor is arranged on the workpiece holder, the detectable feature may be provided on the workpiece holder, in particular its sleeve.

If the sensor does not respond directly to the proximity of the workpiece but responds to the proximity of the workpiece holder to the end effector, the workpiece holder may comprise an auxiliary sensor for detecting the presence of a workpiece in the workpiece holder, and the control unit is configured to actuate the energy converter only in the presence of a workpiece.

Alternatively or additionally, the workpiece holder may comprise several features, the mutual spacing of which is variable and which can only be detected jointly by the sensor when they have a spacing suitable for holding the workpiece in the workpiece holder.

The sensor for detecting the presence of the workpiece may e.g. be a switch which requires the presence of the workpiece in the workpiece holder in order to close.

The drive unit may comprise a first robot arm which connects the end effector to a base.

Preferably, it comprises a second robot arm which connects the workpiece holder to the base.

The invention is explained below with reference to a screwing process as an example of machining. The tool 1 used for machining is thus a screwing tool, and the workpiece 2 to be machined comprises a screw 3 and two components 4 and 5 to be attached to each other by the screw 3.

An end effector 6 is mounted on a robot arm 7, depicted highly diagrammatically in FIG. 1. The robot arm 7 in the normal manner comprises several arm portions 8, 9 which, with a stationary base 10 and the end effector 6, can be pivoted relative to each other about one or more axes by means of servomotors under the control of an electronic control unit 11.

The end effector 6 comprises a tool holder 12 which is pivotably connected to the distal arm portion 9 and on which the screwing tool 1 is mounted so as to be rotatable about an axis 13. A tip 14 of the screwing tool 1 protrudes beyond the tool holder 12 in the direction of the workpiece 2. A motor 15 for driving a rotation of the screwing tool 1 may be integrated in the tool holder 12.

A sleeve 17 is received in a groove 16 of the tool holder 12 extending as a ring around the axis 13. The sleeve 17 is guided on the tool holder 12 so as to be displaceable in the direction of the axis 13; in the position shown, it protrudes beyond the tool holder 12 so far that the tip 14 is situated inside the sleeve 17. In this protective position, the sleeve 17 is fixed by a blocking element 18 relative to the tool holder 12. Here, the blocking element 18 is a bar which penetrates through a hole 19 in the sleeve 17 and thus fixes it by form fit; instead of a bar, a radially movable blocking element may be provided, similar to the clamping chuck of a drill, which fixes the sleeve 17 by friction fit by pressing it against an opposing wall of the groove 16.

The blocking element 18 can be adjusted radially relative to the axis 13 by an actuator 20 under the control of a control unit 11.

A sensor 21 is attached to the end of the sleeve 17 facing the tool holder 12. The sensor 21 may be a proximity switch which responds to the screw 3 and causes a control unit 11 to release the locking of the sleeve 17 by the blocking element 18 when the distance from the screw 3 falls below a predefined limit. This limit is so small that the distance cannot fall below it while a body part of a person may be present between the end of the sleeve 17 and the workpiece 2.

The force with which the robot arm 7 brings the end effector 6 up to the workpiece 2 may be kept sufficiently small to reliably exclude trapping injuries.

In the embodiment of FIG. 1 in which the screw 3 is held between clamping jaws 22 of a workpiece holder 23, the sensor 21 may be configured to respond not to the screw 3 but to the proximity to the clamping jaws 22, and release the sleeve 17 when a limit distance from these has been reached or passed. This limit distance is preferably zero, i.e. the sensor 21 responds to contact with the clamping jaws 22. Such a sensor 21 may in the simplest case be a switch which is actuated, in particular closed, by contact pressure of the sleeve 17 on the clamping jaws 22.

In order to ensure that the switch is not actuated by contact pressure of a foreign body, such as a body part of a person, trapped between the sleeve 17 and the workpiece 2 or workpiece holder 23, the switch must allow a distinction between the workpiece holder 23 and foreign bodies. This may be achieved using mutually complementary contours of the switch and workpiece holder 23. For example, a button of the switch on the end effector 6 may be arranged at the base of a shaft, so that it can only be reached by a protrusion of the workpiece holder 23 which is suitably shaped to penetrate into the shaft during an approach of the end effector 6 to the workpiece 2, preferably an approach in the direction of the axis 13.

Furthermore, the switch may comprise several buttons which can be moved independently of each other and which are only all pressed simultaneously when respective complementary surfaces of the tool holder 23 lie opposite them in the correct orientation.

In the embodiment of FIG. 1, such a button 24 lies opposite each of the at least two clamping jaws 22, and the buttons 24 can only be pressed jointly when the clamping jaws 22 have the required spacing from each other for clamping the screw 3, since only at this spacing can protrusions 25 of both clamping jaws 22 engage in shafts 26 on the sleeve 17. If there is no screw, the clamping jaws 22 may close together so far that the distance between the protrusions 25 is significantly smaller than that between the shafts 26, so that for this reason, the two protrusions 25 cannot simultaneously engage in a shaft 26; if the clamping jaws 22 are spaced too widely to clamp a screw, the distance between the protrusions 25 is also greater than between the shafts 26.

The buttons 24 may each be replaced by a proximity switch which allows penetration of a protrusion 25 into the shaft 26 by electromagnetic interaction.

Figure 2:
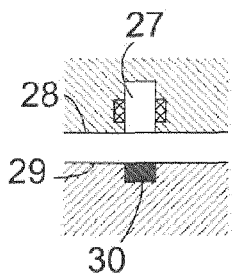
FIG. 2 shows a modified detail of the end effector and workpiece holder in a cross-section along a rotation axis of the tool.

According to a further derivative, such proximity switches 27 are inlaid with flush surface into a closed flat end face 28 of the sleeve 17, and the opposing end face 29 of the workpiece holder 23 comprises protrusions for detecting the proximity switches 27; or, as shown in FIG. 2, bodies 30 are provided with dielectric properties deviating from their environment, e.g. metallic bodies 30 in an otherwise non-metallic end face 29, or magnetic bodies 30 in an otherwise non-magnetic end face 29, to which the proximity switches 27 respond as soon as the end faces 28, 29 make contact with each other.

Figure 3:
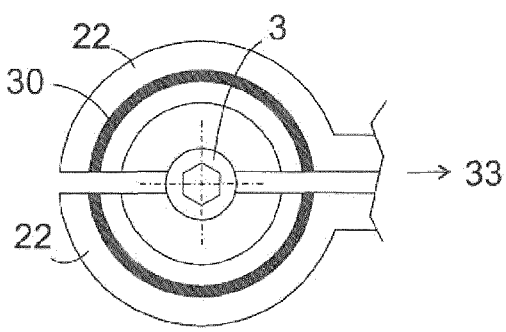
FIG. 3 shows a detail of the tool holder in a top view onto the rotation axis.

The protrusions or bodies 30 may, as shown in FIG. 3, be distributed over the clamping jaws 22 of the workpiece holder 23 and extend in a ring around the axis 13. In this way, detection of the proximity of the end effector 6 to the workpiece 2 may be made largely independent of any possible twist—insignificant for the screwing process—of the end effector 6 and workpiece holder 23 relative to each other about the axis 13.

With further reference to FIG. 1, an auxiliary sensor 31 may be provided in order to detect the presence of a screw 3 between the clamping jaws 22. This auxiliary sensor 31 may be formed e.g. by electrodes on both clamping jaws 22, between which a current can flow only when they are conductively connected together by a screw 3 clamped between them.

When the sensor 21 has detected the proximity of the end effector 6 to the workpiece holder 23, and the auxiliary sensor 31 (where fitted) indicates that a screw 3 is actually present in the workpiece holder 23, the control unit 11 actuates the actuator 20 in order to retract the blocking element 18 from the hole 19 of the sleeve 17, and thus allow movement of the sleeve 17 relative to the tool holder 12. The control unit 11 actuates the robot arm 7 to move the end effector 6 up to the workpiece 2 in the direction of the axis 13; the sleeve 17 is pushed back into the groove 16 of the tool holder 12 and thus compresses a spring 32. Instead of the spring 32, another return device generating a return force may be provided.

Figure 4:
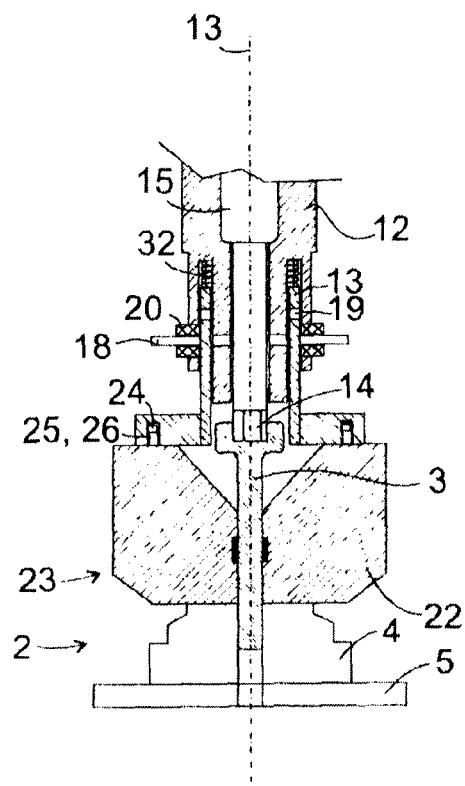
FIG. 4 shows a diagrammatic cross-section through the end effector and workpiece holder during machining of the workpiece.

The movement of the tool holder 12 in the direction of the workpiece 2 continues until the tip 14 of the screwdriver 14 protrudes beyond the end face 28 of the sleeve 13 and engages in the screw 3. FIG. 4 shows the resulting usage position of the end effector 6 in a sectional depiction similar to FIG. 1. The protrusions 25 are engaged in all shafts 26 and press against the buttons 24. At this stage, the control unit 11 starts the motor 15 in order to screw the screw 3 into the components 4 and 5.

After the screw 3 has been screwed into the components 4, 5, the end effector 6 is withdrawn again from the workpiece holder 23; the spring 32 then pushes the sleeve 17 back into the protective position shown in FIG. 1, and the blocking body 18 engages again in the hole 19 of the sleeve 17, in order to lock the sleeve 17 in the protective position.

According to the exemplary embodiment of FIG. 1, the workpiece holder 23 can also be moved by means of a robot arm 33. To prepare for machining of the next workpiece 2, the workpiece holder 23 may therefore be moved aside in order to take a further screw 3 between its clamping jaws from a container while new components 4, 5 are prepared, and the robot arm 33 places the received screw as shown in FIG. 1 with its tip at a hole of the component 4. The approach of the end effector 6 can now be repeated as described above.

For the processes described above, it is not important whether a sensor is arranged on the end effector 6 as described above and detects features of the workpiece holder 23, such as the protrusions 25 or bodies 30 described above, or whether a corresponding sensor on the workpiece holder detects features of the end effector 6. Therefore the features to be detected may be provided in equivalent fashion on the sleeve 17 and lie opposite a sensor of the workpiece holder 23.

As a drive unit for moving the end effector 6, instead of the robot arm 6 for example a gantry crane may be considered with a trolley which is movable in at least one degree of freedom.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Tool
2 Workpiece
3 Screw
4 Component
5 Component

6 End effector
7 Robot arm
8 Arm portion
9 Arm portion
10 Base
11 Control unit
12 Tool holder
13 Axis
14 Tip
15 Motor
16 Groove
17 Sleeve
18 Blocking element
19 Hole
20 Actuator
21 Sensor
22 Clamping jaws
23 Tool holder
24 Button
25 Protrusion
26 Shaft
27 Proximity switch
28 End face
29 End face
30 Body
31 Auxiliary sensor
32 Spring
33 Robot arm

What is claimed is:

1. An end effector, comprising:
a tool holder;
a tool which is attached in protruding fashion to the tool holder;
a sleeve which is movable on the tool holder between a protective position in which it surrounds the tool and a usage position in which it is pushed towards the tool holder and configured to release at least a tip of the tool; and
a blocking element which is movable, under control of a sensor configured to detect a proximity of the end effector to a workpiece, between a blocking position in which it blocks the sleeve in the protective position, and a release position in which it allows a movement of the sleeve into the usage position.

2. The end effector of claim 1, wherein, in the release position of the blocking element, the sleeve is freely movable between the protective position and the usage position by a force acting from outside.

3. The end effector of claim 1, wherein the sleeve is loaded into the protective position by a return device configured to generate a return force.

4. The end effector of claim 1, wherein the end effector comprises the sensor.

5. The end effector of claim 1, wherein the sensor is arranged on the sleeve.

6. The end effector of claim 1, wherein the sensor comprises a touch-sensitive sensor or a proximity sensor.

7. A robot system, comprising:
the end effector of claim 1; and
a drive unit configured to move the end effector relative to the tool holder.

8. The robot system of claim 7, further comprising:
an energy converter configured to actuate the tool; and
a control unit configured to actuate the energy converter only when the blocking element is in the release position.

9. The robot system of claim 7, wherein the tool holder comprises at least one feature which is detectable by the sensor.

10. The robot system of claim 9, wherein the tool holder comprises several features, a mutual spacing of which is variable and which is only detectable jointly by the sensor when they have a spacing suitable for holding the workpiece in the workpiece holder.

11. The robot system of claim 7, further comprising:
an energy converter configured to actuate the tool; and
a control unit configured to actuate the energy converter only when the blocking element is in the release position,
wherein the tool holder comprises at least one feature which is detectable by the sensor,
wherein the workpiece holder comprises an auxiliary sensor configured to detect a presence of a workpiece in the workpiece holder, and
wherein the control unit is configured to actuate the energy converter only in the presence of a workpiece.

12. The robot system of claim 7, wherein the drive unit comprises a first robot arm which connects the end effector to a base.

13. The robot system of claim 12, wherein the drive unit comprises a second robot arm which connects the workpiece holder to the base.

* * * * *